E. RIPLEY.
Tea Kettle.
No. 2,122. Reissued Dec. 5, 1865.
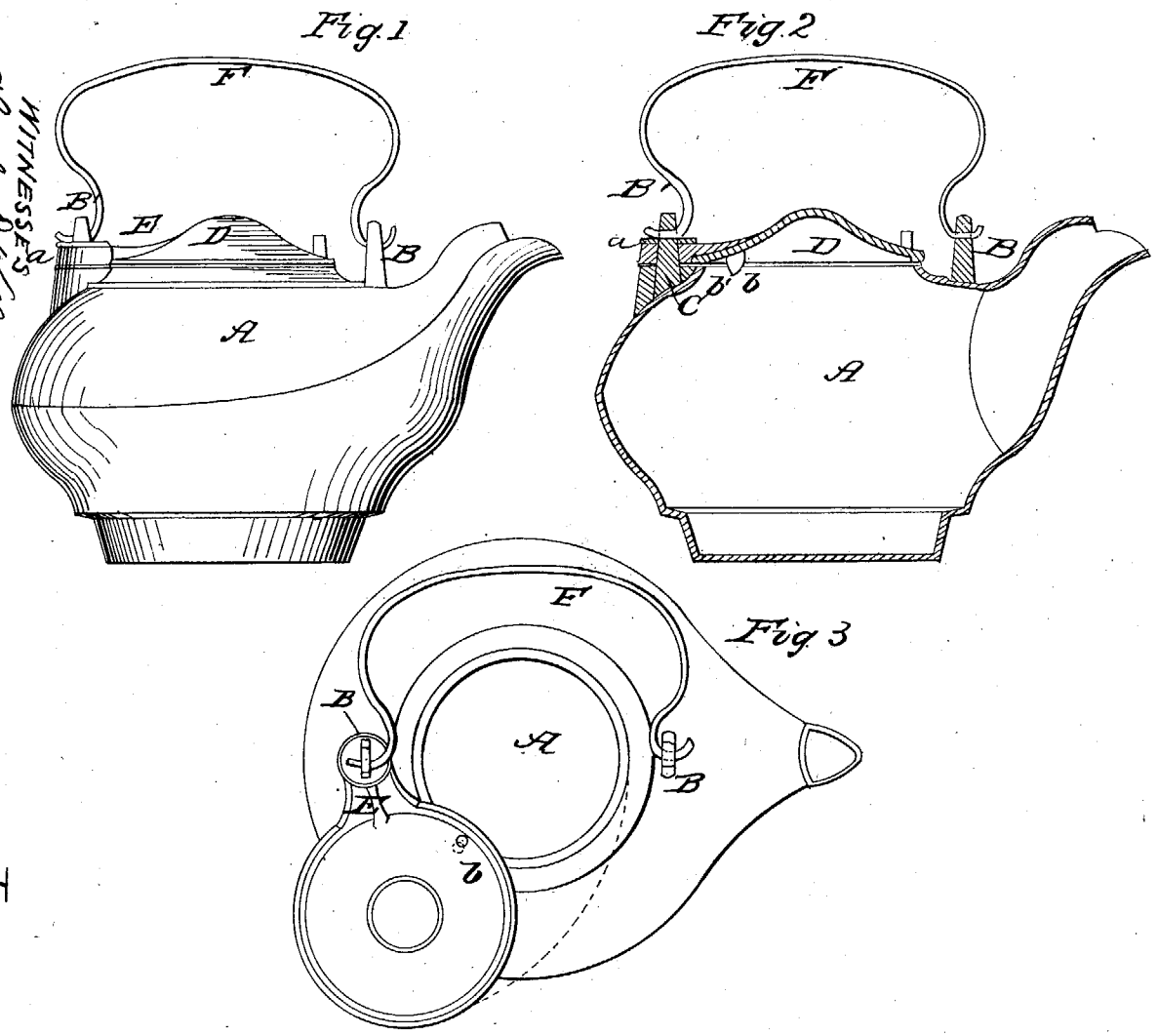
WITNESSES
Charles D. Kellum
W. MacGregor
INVENTOR
Ezra Ripley
N. PETERS, Photo-Lithographer, Washington, D. C.

UNITED STATES PATENT OFFICE.

EZRA RIPLEY, OF TROY, NEW YORK.

IMPROVEMENT IN TEA-KETTLES.

Specification forming part of Letters Patent No. 31,055, dated January 1, 1861; Reissue No. 2,122, dated December 5, 1865.

*To all whom it may concern:*

Be it known that I, EZRA RIPLEY, of Troy, in the county of Rensselaer and State of New York, have invented a certain new and useful improvement in the manner of constructing the covers of tea-kettles or spouted and bailed metallic hollow ware; and I do hereby declare that the following is a full, clear, and exact description of the same, reference being hereby had to the accompanying drawings, which make and form a part of this specification.

Figure 1 is a side elevation of a kettle. Fig. 2 is a vertical section through the center on the line of the spout and bail. Fig. 3 is a top view of the same, showing my method of hanging the covers of metallic hollow ware.

The same letters have reference to like or corresponding parts.

Tea-kettle covers, as ordinarily constructed and applied to cast metallic tea-kettles now in common use for culinary purposes, are defective in point of convenience and perfect safety to those persons handling or using such kettles, as in the act of pouring hot water from the same the old cover in ordinary use is apt to fall off from and uncover the kettle, allowing steam to issue therefrom, which scalds the hand holding the kettle. This defect in the ordinary cover is regarded by all persons using tea-kettles for culinary purposes as exceedingly inconvenient and annoying, as sometimes causing severe scalds on the hand. To obviate or remedy these defects in the old tea-kettle cover is the object of my improvement.

The nature of my said invention therefore consists in the employment of a tea-kettle cover so constructed, arranged, and combined with the tea-kettle as to be moved in a lateral or horizontal direction from and over the top or from the opening in the top of the tea-kettle while the said tea-kettle is suspended upon and by means of the bail in the hands of the person using or operating the same, in the manner and for the purposes substantially as herein described and set forth.

I so construct tea-kettle covers that when in use on the kettle they cannot fall off and expose the hand to the scalding steam which would issue therefrom when hot water or other hot steaming liquids is poured from the kettle-spout, and the cover, if off the kettle or unclosed when about to pour from the spout, is made self-closing over the kettle by means of its own weight, in connection with arranging its point of attachment to the kettle in a line with the spout and bail of the kettle, in the manner substantially as hereinafter shown and described. By the use of the above described improved tea-kettle cover a person in the act of pouring hot steaming liquids from the kettle-spout is effectually shielded from all danger of scalds or burns by steam on the hand holding the kettle, even when the kettle is held by an incautious person, thus rendering the self-closing, non-falling off cover a most desirable improvement in tea-kettle covers for all persons engaged in culinary operations.

The description of my improvement is as follows, viz: A is a swing or set-bailed handle tea-kettle, having the handle lugs or ears B and B′. The lug B′ has formed upon its lower part a bearing or journal, *c*. The cover D is constructed with a neck, E, having an eye, *a*, by means of which the cover is attached to the lug B′ so as to form a center bearing, upon which center the cover may be swung off from the top of the kettle or from the opening therein when desiring to uncover the same, as seen in Fig. 3.

E is a swinging bail handle, having its bearing ends inserted into the eyes of the kettle lugs or ears, but the lug B′ has its eye drilled in such a relative position to a washer of the cover or the cover alone, or any equivalent for either, so that the bearing end of the bail when inserted into the eye shall keep the kettle-cover in proper position on the lug B′, or its equivalent, that it may operate as described.

*b* is a stop, formed on the inside of the cover and projecting below the upper edge of the kettle, for the purpose of limiting the extreme swing of the cover and confining it to its range of effectual duty aforesaid.

The said lug or ear B′, to which the said cover-neck E is connected in such a manner as to let the said cover swing in a horizontal direction either to the right or left in case the said neck is on a direct line with the bail-bearing; but said neck may be upon either side of the direct line on which the bail F is suspended, and there be so connected or combined with said lug or ear B′ as to allow said cover D to swing out from and over the said top or opening in the top of the tea-kettle A, and not interfere with or be prevented from so doing by the said lug or ear B, or by the said bail F when in a standing or upright position for use. In either case the invention and principle are the same. It is quite manifest that said cover D may be removed or swing in the manner and for the purposes aforesaid by various mechanical means or devices for the attachment or union of said cover with said tea-kettle A, so as to allow the same to be moved for the purposes aforesaid in a horizontal direction. The stop *b* is for the purpose of properly adjusting said cover D over the opening in the top of the said tea-kettle A, as aforesaid.

If, however, it be desirable to remove or to swing said cover to the left or opposite direction than shown at said Fig. 3, it may be done by casting the said cover D with the said stop *b* thereon of that length or size which will permit of the raising up of the said cover sufficiently to allow the said stop to pass over the top of the said tea-kettle, for the purposes substantially as herein described and set forth. The casting of the said tea-kettle cover as last above described, so as to allow of the swinging of the same to the left or to the right, as aforesaid, is but a modification of my aforesaid invention and improvement in tea-kettles and the covers thereof.

What I claim as new, and desire to secure by Letters Patent of the United States, is—

The employment of an improved and more convenient article of tea-kettle cover, substantially the same as herein fully described and shown, and attached to or combined with spouted and bailed metallic hollow ware or tea-kettles, in the manner and for the purposes substantially as herein described and set forth.

In testimony whereof I have hereto set my hand this 9th day of January, A. D. 1865.

EZRA RIPLEY.

Witnesses:

CHARLES D. KELLUM,

B. MACGREGOR.